United States Patent
Chang et al.

(10) Patent No.: US 12,405,987 B2
(45) Date of Patent: Sep. 2, 2025

(54) ANNOTATION DATA DETERMINATION METHOD AND APPARATUS, AND READABLE MEDIUM AND ELECTRONIC DEVICE

(71) Applicant: Beijing Bytedance Network Technology Co., Ltd., Beijing (CN)

(72) Inventors: Ling Chang, Beijing (CN); Heng Kang, Beijing (CN); Xin Liao, Beijing (CN); Ke Shen, Beijing (CN); Leizhen Sun, Beijing (CN); Tengfei Bao, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/552,781

(22) PCT Filed: Mar. 17, 2022

(86) PCT No.: PCT/CN2022/081502
§ 371 (c)(1),
(2) Date: Sep. 27, 2023

(87) PCT Pub. No.: WO2022/206413
PCT Pub. Date: Oct. 6, 2022

(65) Prior Publication Data
US 2024/0176809 A1    May 30, 2024

(30) Foreign Application Priority Data
Mar. 31, 2021    (CN) .......................... 202110351435.0

(51) Int. Cl.
*G06F 16/35*    (2025.01)
*G06F 16/335*    (2019.01)
*G06F 16/353*    (2025.01)

(52) U.S. Cl.
CPC .......... *G06F 16/353* (2019.01); *G06F 16/335* (2019.01)

(58) Field of Classification Search
CPC ............................ G06F 16/353; G06F 16/335
(Continued)

(56) References Cited

U.S. PATENT DOCUMENTS

| 2020/0160838 A1 | 5/2020 | Lee |
| 2022/0229984 A1* | 7/2022 | Miao ...................... G06N 3/084 |
| 2022/0269939 A1* | 8/2022 | Zhao ...................... G06F 40/30 |

FOREIGN PATENT DOCUMENTS

| CN | 103150454 B | 6/2015 |
| CN | 110149266 A | 8/2019 |

(Continued)

OTHER PUBLICATIONS

Learning with labeled and unlabeled data, Matthias Seeger, pp. 1-62, Dec. 19, 2002. (Year: 2002).*

(Continued)

*Primary Examiner* — Hicham Skhoun

(57) ABSTRACT

The present disclosure relates to an annotation data determination method and apparatus, and a readable medium and an electronic device. By means of the present disclosure, high-quality data to be annotated is obtained for model performance evaluation. The method includes: acquiring candidate data from a candidate data set; respectively inputting the candidate data into a first text recognition model and a second text recognition model, so as to obtain a first recognition result output by the first text recognition model and a second recognition result output by the second text recognition model, wherein both the first text recognition model and the second text recognition model can recognize whether text data is of a target category; according to the first recognition result and the second recognition result, determining whether the candidate data meets an annotation (Continued)

condition, wherein the annotation condition is the category of the candidate data being recognized by the first text recognition model or the second text recognition model as at least one target category among target categories; and if it is determined that the candidate data meets the annotation condition, determining the candidate data as text data to be annotated.

14 Claims, 3 Drawing Sheets

(58) Field of Classification Search
USPC .......................................................... 707/740
See application file for complete search history.

(56) References Cited

FOREIGN PATENT DOCUMENTS

| | | | | | |
|---|---|---|---|---|---|
| CN | 111754984 | A | | 10/2020 | |
| CN | 113051400 | A | | 6/2021 | |
| CN | 108090099 | B | * | 2/2022 | ............. G06F 16/35 |
| WO | 2021025290 | A1 | | 2/2021 | |

OTHER PUBLICATIONS

Distinguishing Mislabeled Data from Correctly Labeled Data in Classifier Design, Sundara Venkataraman, pp. 1-5. © 2004 IEEE. (Year: 2004).*

Combining Labeled and Unlabeled Data with Co-Training, Avrim Blum and Tom Mitchell pp. 1-9. Published: Jul. 24, 1998. (Year: 1998).*

First Office Action issued Jul. 27, 2023 in Chinese Application No. 202110351435.0, with English translation (13 pages).

International Preliminary Report on Patentability issued Oct. 3, 2023 in International Application No. PCT/CN2022/081502 (6 pages).

* cited by examiner

ANNOTATION DATA DETERMINATION METHOD AND APPARATUS, AND READABLE MEDIUM AND ELECTRONIC DEVICE

CROSS-REFERENCE TO RELATED APPLICATIONS

This application is a U.S. National Stage Application under 35 U.S.C. § 371 of International Patent Application No. PCT/CN2022/081502, filed on Mar. 17, 2022, which is based on and claims the benefit of priority to the Chinese patent application No. 202110351435.0 filed on Mar. 31, 2021, which is hereby incorporated by reference in its entirety into the present application.

TECHNICAL FIELD

The present disclosure relates to the field of computer technology, in particular to a method and device for determining labeled data, a non-transitory readable medium and an electronic device.

BACKGROUND

Generally, for a classification model, the performance of the model may be evaluated from a plurality of evaluation dimensions, wherein the evaluation dimensions may comprise, for example, a precision ratio (Precision), a recall ratio (Recall), a F1 value (F1-score), a recall amount, and so on. For example, during the replacement process of online model, it is necessary to evaluate the earlier and latter versions of the model, so that the latter version of model will be put into service only in the case that the performance of the latter version of model is confirmed to be better than the earlier version of model (i.e., the current online model).

In the related art, when the model is evaluated, the evaluation value under a corresponding evaluation dimension may be provided based on a classification performance of the model on a full labeled fixed test set and then the performance of each model under a specified evaluation dimension may be evaluated according to the evaluation value corresponding to each model.

SUMMARY

The summary of this invention is provided to introduce concepts in a concise form, which will be described in detail in the following detailed description. The summary of this invention is neither intended to identify the key features or essential features of the technical solution for which protection is sought, nor intended to limit the scope of the technical solution for which protection is sought.

According to a first aspect, the present disclosure provides a method for determining labeled data, the method comprising: obtaining candidate data from a candidate data set, wherein the candidate data set is a set constituted by a plurality of unlabeled text data; inputting the candidate data into a first text recognition model and a second text recognition model respectively to obtain a first recognition result output from the first text recognition model and a second recognition result output from the second text recognition model, wherein the first text recognition model and the second text recognition model are both capable of recognizing whether text data belongs to a target category; determining whether the candidate data meets labeling condition according to the first recognition result and the second recognition result, wherein the labeling condition is that the candidate data is recognized by the first text recognition model and/or the second text recognition model as belonging to the target category; determining the candidate data as text data to be labeled if it is determined that the candidate data meets the labeling condition.

According to a second aspect, the present disclosure provides a device for determining labeled data is provided, the device comprising: a first obtaining module configured to obtain candidate data from a candidate data set, wherein the candidate data set is a set constituted by a plurality of unlabeled text data; an input module configured to input the candidate data into a first text recognition model and a second text recognition model respectively, and obtain a first recognition result output from the first text recognition model and a second recognition result output from the second text recognition model, wherein the first text recognition model and the second text recognition model are both capable of recognizing whether text data belongs to a target category; a first determining module configured to determine whether the candidate data meets labeling condition according to the first recognition result and the second recognition result, wherein the labeling condition is that the candidate data is recognized by the first text recognition model and/or the second text recognition model as belonging to the target category; a second determining module configured to determine the candidate data as text data to be labeled if it is determined that the candidate data meets the labeling condition.

According to a third aspect, the present disclosure provides a non-transitory computer-readable medium having a computer program stored thereon that, when executed by a processing device, implements the steps of the method according to the first aspect of the present disclosure.

According to a fourth aspect, the present disclosure provides an electronic device, comprising: a storage device having a computer program stored thereon; a processing device for executing the computer program in the storage device to implement the steps of the method according to the first aspect of the present disclosure.

According to a fifth aspect, the present disclosure provides a computer program, wherein the computer program comprises: instructions that, when executed by a processor, cause the processor to perform the method for determining labeled data according to any of the above-described embodiments.

According to a sixth aspect, the present disclosure provides a computer program product, wherein the computer program product comprises: instructions that, when executed by a processor, cause the processor to perform the method for determining labeled data according to any of the above-described embodiments.

Other features and advantages of the present disclosure will be described in detail in the following detailed description.

BRIEF DESCRIPTION OF THE DRAWINGS

The above-described and other features, advantages and aspects of embodiments of the present disclosure will become more apparent in conjunction with the accompanying drawings and with reference to the following detailed description. Throughout the accompanying drawings, the same or similar reference numerals indicate the same or similar elements. It should be understood that the accompanying drawings are schematic, and the members and elements are not necessarily drawn to scale. In the accompanying drawings.

DETAILED DESCRIPTION

Figure 1:
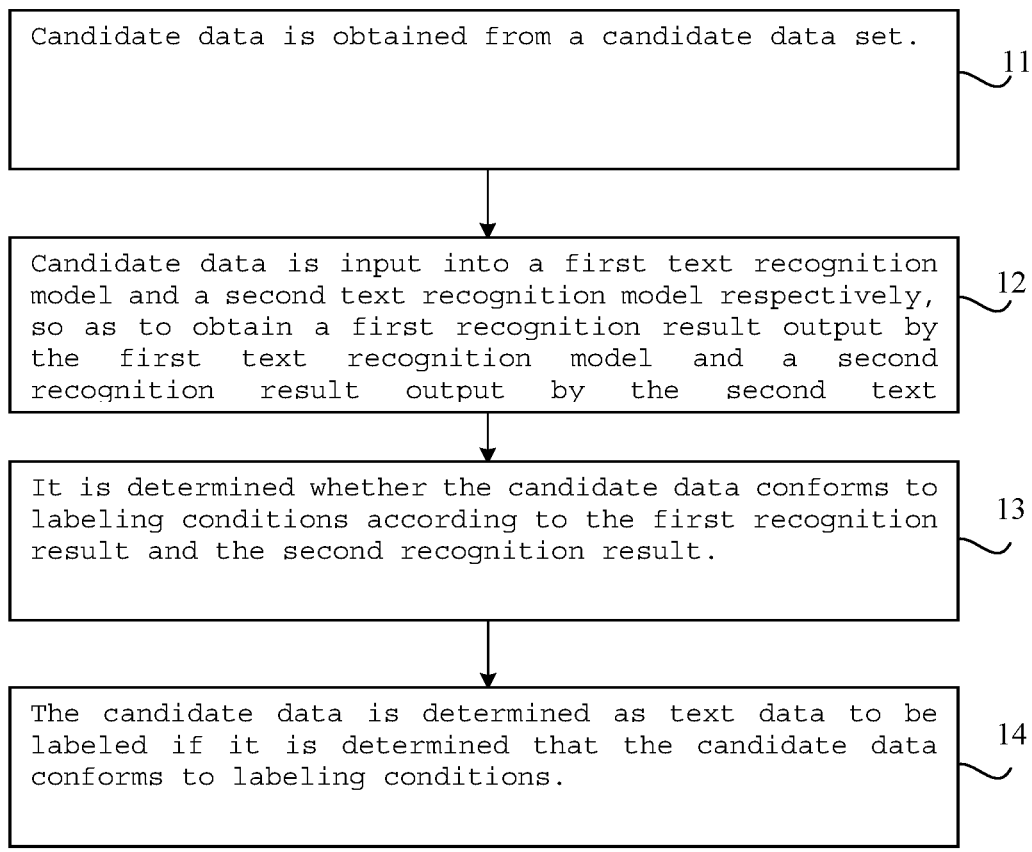
FIG. 1 is a flowchart of a method for determining labeled data provided according to embodiments of the present disclosure.

The embodiments of the present disclosure will be described in more detail with reference to the accompanying drawings below. Although the accompanying drawings illustrate some embodiments of the present disclosure, it should be understood that the present disclosure may be implemented in various forms, and should not be construed as being limited to the embodiments set forth herein. Rather, these embodiments are intended for a more thorough and complete understanding of the present disclosure. It should be understood that the accompanying drawings and embodiments of the present disclosure are only for illustrative purposes, rather than for limiting the protection scope of the present disclosure.

It should be understood that the various steps recited in the method embodiments of the present disclosure may be performed according to different sequences, and/or performed in parallel. In addition, the method embodiments may comprise additional steps and/or omit to perform the illustrated steps. The scope of the present disclosure is not limited in this respect.

As used herein, the term "comprising" and its variants are open-ended inclusion, that is, "comprising but not limited to". The term "based on" means "at least partially based on". The term "embodiments" means "at least embodiments"; the term "another embodiment" means "at least one additional embodiment"; and the term "some embodiments" means "at least some embodiments". The related definitions of other terms will be given in the following description.

It should be noted that the concepts such as "first" and "second" mentioned in the present disclosure are only used to distinguish different devices, modules or units, but not to limit the order or interdependence of functions performed by these devices, modules or units.

It should be noted that the modifications of "one" and "a plurality of" mentioned in the present disclosure are illustrative rather than restrictive, and those skilled in the art should understand that they should be understood as "one or more" unless contextually specified otherwise.

The names of messages or information exchanged between multiple devices in the embodiments of the present disclosure are only used for illustrative purposes, but not for limiting the scope of these messages or information.

Since the fixed evaluation set and the online real-time data are not in the same distribution, the comparison effect after the model is online cannot be accurately reflected by the evaluation based on the fixed evaluation set. Based on the above-described reasons, it is necessary to evaluate the model by using a random evaluation set in the same distribution as online real-time data. However, online real-time data is updated fast with a large amount of data. At the same time, the data in the evaluation set may be used to evaluate the model only after being labeled.

Therefore, the evaluation of the model using a random evaluation set is present with the problem of high labeling cost, and the precision of evaluation cannot be ensured.

As described above, the current evaluation of an online classification model is present with the problems of high labeling cost and inadequate precision. For example, at present, when a model is evaluated, 200~1000 items may be generally sampled centrally from random test set comprising 100,000~1 million items of data for labeling, and the Precision and the Recall of the model are estimated after labeling. For the Precision, 200~500 items may be sampled from the samples greater than a model threshold (a threshold used in model classification) for labeling and evaluation; for the Recall, 200~500 items below the model threshold may be sampled for labeling, so as to predict the number of missed recalls, and further estimate the Recall. The above-described method is qualified in the aspect of estimating the Precision. However, when the Recall is estimated, since there is a great fluctuation in sampling, the estimated value cannot serve as an objective basis for comparing the Recalls of the two models, which leads to the problem of inadequate precision.

In order to solve the above-described technical problem, the present disclosure provides a method and device for determining labeled data, a readable medium and an electronic device, so as to obtain high-quality data to be labeled for model performance evaluation.

FIG. 1 is a flowchart of a method for determining labeled data provided according to embodiments of the present disclosure. As shown in FIG. 1, this method may comprise the following steps.

In Step 11, candidate data is obtained from a candidate data set.

In Step 12, candidate data is input into a first text recognition model and a second text recognition model respectively, so as respectively to obtain a first recognition result output from the first text recognition model and a second recognition result output from the second text recognition model.

In Step 13, it is determined whether the candidate data meets labeling condition according to the first recognition result and the second recognition result.

In Step 14, the candidate data is determined as text data to be labeled if it is determined that the candidate data meets labeling condition.

The candidate data set is a set constituted by a plurality of unlabeled text data.

It is to be noted that, before Step 11 is performed, the candidate data set may also be pre-processed, for example the text data therein is subjected to Deduplication processing. For example, the degree of similarity between various text data in the candidate data set may be compared, and for a plurality of text data with a high degree of similarity, it suffices that only one text data is retained.

Based on the candidate data set, in Step 11, candidate data is first obtained from the candidate data set, that is, one piece of text data in the candidate data set is obtained. It may be seen that Steps 11 to 14 are directed to one candidate data in the candidate data set, so as to determine whether the candidate data may serve as data to be labeled. In an actual application scenario, each piece of text data in the candidate data set may serve as candidate data respectively, and whether the each piece of text data may serve as data to be labeled may be determined respectively, so that a batch of text data may be selected from the candidate data set as data to be labeled for subsequent model evaluation.

After the candidate data is obtained, Step 12 is performed so that candidate data is input into a first text recognition model and a second text recognition model respectively, so as respectively to obtain a first recognition result output from the first text recognition model and a second recognition result output from the second text recognition model.

The first text recognition model and the second text recognition model are both capable of identifying whether text data belongs to a target category. That is, the first text recognition model and the second text recognition model are both classification models (which may be a binary classification model or a multiple classification model). As described previously, the first text recognition model and the second text recognition model are the earlier version and latter version of a model respectively, with the same function.

In some embodiments, the first text recognition model and the second text recognition model are both configured to perform classification based on the text data input into the model, and output a classification result for the text data, so that the first recognition result and the second recognition result are both configured to indicate whether the candidate data belongs to the target category.

In other embodiments, the first text recognition model and the second text recognition model are both configured to score the text data input into the model and output a scoring result for the text data. Moreover, it may be determined whether text data belongs to a target category by a score corresponding to the scoring result. For example, if the scoring result is greater than or equal to a certain score, it may be determined that the text data input into the model belongs to a target category. Otherwise, it may be considered that the text data input into the model does not belong to the target category. Therefore, in this embodiment, the first recognition result may be the first score output from the first text recognition model for the candidate data, and the second recognition result may be the second score output from the second text recognition model for the candidate data.

After the first recognition result and the second recognition result are obtained, Step 13 may be performed. In Step 13, it is determined whether the candidate data meets labeling condition according to the first recognition result and the second recognition result.

The labeling condition is that the candidate data is recognized by the first text recognition model and/or the second text recognition model as belonging to the target category.

In some embodiments, as described above, the first recognition result and the second recognition result may both be configured to indicate whether the candidate data belongs to the target category.

In this embodiment, Step 13 may comprise the following steps.

If the first identification result indicates that the candidate data belongs to a target category, or if the second identification result indicates that the candidate data belongs to a target category, it is determined that the candidate data meets labeling condition.

In other embodiments, as described above, the first recognition result is the first score output from the first text recognition model for the candidate data, and the second recognition result is the second score output from the second text recognition model for the candidate data.

In this embodiment, Step 13 may comprise the following steps.

If the first score is greater than or equal to the score threshold, or if the second score is greater than or equal to the score threshold, it is determined that the candidate data meets labeling condition.

Figure 2:
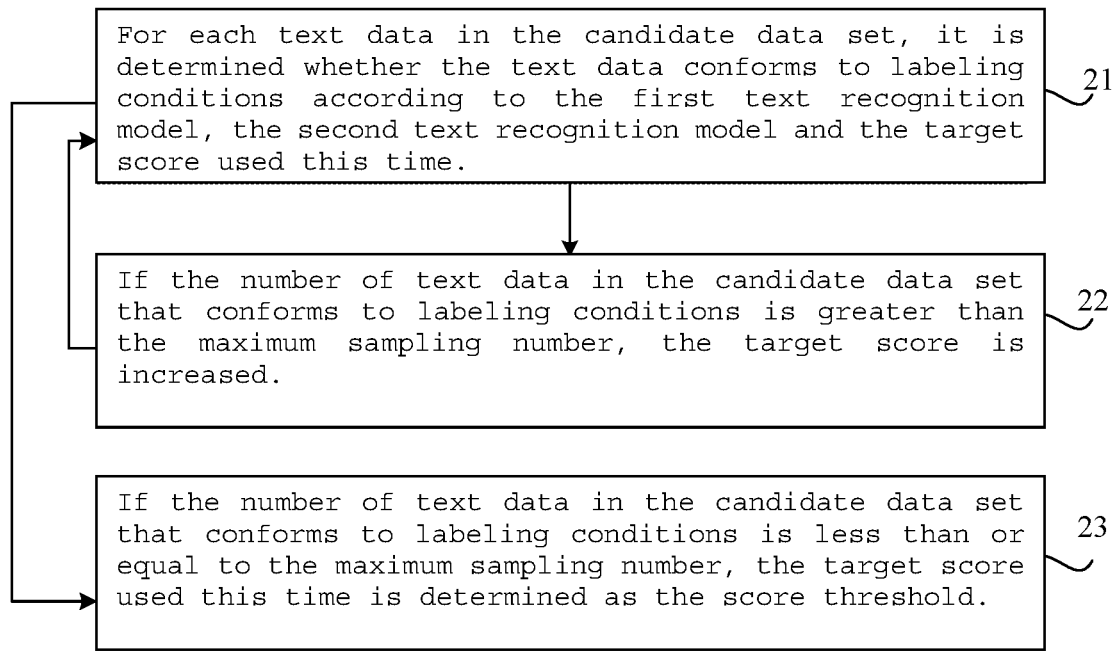
FIG. 2 is an exemplary flowchart for determining a score threshold in a method for determining labeled data provided by the present disclosure.

In some embodiments, the score threshold may be determined through the following steps 21 to 23, as shown in FIG. 2.

In Step 21, for each piece of text data in the candidate data set, it is determined whether the text data meets labeling condition according to the first text recognition model, the second text recognition model and the target score used this time.

In Step 21, for each piece of text data in the candidate data set, the following steps may be performed.

The text data is input into the first text recognition model and the second text recognition model to obtain a third score output from the first text recognition model and a fourth score output from the second text model.

If the third score is greater than or equal to the target score, or if the fourth score is greater than or equal to the target score, it is determined that the text data meets labeling condition.

By way of the above-described method, it may be determined whether each piece of text data in the candidate data set meets labeling condition, so that it is possible to determine the number of text data in the candidate data set that meets labeling condition.

In Step 22, if the number of text data in the candidate data set that meets labeling condition is greater than the maximum sampling number, the target score is increased, and after returning to Step 21 according to the increased target score, it is determined whether the number of text data in the candidate data set that meets labeling condition is greater than the maximum sampling number, so as to determine whether to perform Step 22 or Step 23.

The maximum sampling number may be determined based on the empirical value, which is configured to define a maximum number of data to be labeled. Since it is necessary to spend a cost in labeling the data, and an excessive labeling cost may be spent for a large number of data required to be labeled, it is necessary to limit the number of data required to be labeled by the maximum sampling number.

If it is determined that the number of text data in the candidate data set that meets labeling condition is greater than the maximum sampling number after the processing in Step 21, it means that it is possible to lead to an excessive number of text data to be labeled if sampling is performed according to the current target score. It is necessary to take a lot of time to label these data, which will have a negative impact on the subsequent model evaluation. For this reason, it is possible to increase the target score so as to raise a threshold for determining the data to be labeled. When the target score is increased, less text data will be selected as the data to be labeled, thereby achieving the purpose of reducing the number of text data in the candidate data set that meets the labeling condition. Therefore, it is possible to increase the target score, and return to Step 21 based on the increased target score. When returning to Step 21, the increased target score is the target score used this time (this time means the time to return to Step 21).

In Step 23, if the number of text data in the candidate data set that meets labeling condition is less than or equal to the maximum sampling number, the target score used this time is determined as the score threshold.

If it is determined that the number of text data in the candidate data set that meets labeling condition is less than or equal to the maximum sampling number after the processing in Step 21, it means that the number of text data required to be labeled does not exceed the maximum sampling number if sampling is performed according to the current target score. To label these data will not spend an excessive cost, so that the target score used this time is appropriate. Therefore, it is possible to determine the target score used this time as the score threshold.

Alternatively, when the score threshold is determined, it is also possible to refer to the following steps.

If the number of text data in the candidate data set that meets labeling condition is less than the minimum sampling number, the target score is reduced to return to Step 21.

If the number of text data in the candidate data set that meets labeling condition is within a numerical interval constituted by the minimum sampling number and the maximum sampling number, the target score used this time is determined as the score threshold.

The minimum sampling number which may be determined based on the empirical value, is configured to define a minimum number of data to be labeled. Since insufficient data have a slight effect on the evaluation of the model, it is necessary to limit the number of data required to be labeled by the minimum sampling number so as to ensure that enough data to be labeled may be obtained.

If it is determined that the number of text data in the candidate data set that meets labeling condition is less than the minimum sampling number after the processing in Step 21, it means that it is possible to lead to an inadequate number of text data to be labeled if sampling is performed according to the current target score, which will have a negative impact on the subsequent model evaluation. For this reason, it is possible to reduce the target score so as to lower a threshold for determining the data to be labeled. When the target score is reduced, more text data will be selected as the data to be labeled, thereby achieving the purpose of increasing the number of text data in the candidate data set that meets the labeling condition. Therefore, it is possible to reduce the target score, and return to Step 21 based on the reduced target score. When returning to Step 21, the reduced target score is the target score used this time (this time means the time to return to Step 21).

If it is determined that the number of text data in the candidate data set that meets labeling condition is within a numerical interval constituted by the minimum sampling number and the maximum sampling number after the processing in Step 21, it means that the number of text data required to be labeled will be within an appropriate numerical interval if sampling is performed according to the current target score. Enough data to be labeled may be obtained, and to label these data will not spend an excessive cost as well, so that the target score used this time is very appropriate. Therefore, it is possible to determine the target score used this time as the score threshold.

By way of the above-described method, a score threshold is set so that it is possible to flexibly adjust the number of selected data to be labeled, which may be suitable for various evaluation requirements.

Returning to FIG. 1, in Step 14, if it is determined that the candidate data meets labeling condition, the candidate data will be determined as text data to be labeled.

By way of the above-described technical solution, candidate data is obtained from a candidate data set constituted by a plurality of unlabeled text data, and candidate data is input into the first text recognition model and the second text recognition model respectively to obtain a first recognition result output from the first text recognition model and a second recognition result output from the second text recognition model. Thereinafter, it is determined whether the candidate data meets labeling condition according to the first recognition result and the second recognition result, and if the candidate data meets labeling condition, the candidate data is determined as the text data to be labeled. The first text recognition model and the second text recognition model are both capable of identifying whether text data belongs to a target category, and the labeling condition is that the candidate data is recognized by the first text recognition model and/or the second text recognition model as belonging to the target category. Thus, only the text data that is recognized by the first text recognition model and/or the second text recognition model as belonging to the target category may be determined as the data to be labeled and used in the model performance evaluation of the first text model and the second text model. On the one hand, since the text data recognized by both the first text recognition model and the second text recognition model as not belonging to the target category has a slight effect on the model performance evaluation of the above-described two models, it is possible to filter out from the candidate data set the text data capable of presenting a preferred performance in the aspect of the model performance evaluation by way of the method provided by the present disclosure. On the other hand, since the text data recognized by both the first text recognition model and the second text recognition model as not belonging to the target category usually occupy a large proportion in the candidate data set, a large number of text data in the candidate data set may be filtered out by way of the method provided by the present disclosure, so that it is possible to avoid the problem of a high labeling cost due to the selection of a large number of data in the candidate data set as data to be labeled.

Alternatively, after the candidate data is determined as text data to be labeled in Step 14, the method provided by the present disclosure may further comprise the following steps.

Return to Step 11 until any of the following two conditions is satisfied: all the text data in the candidate data set are traversed; or the number of text data to be labeled reaches a preset sampling number.

That is, after it is determined whether the current candidate data may serve as data to be labeled, it is possible to select new candidate data from the candidate data set again and repeat the above-described process until all the data in the candidate data set are traversed, or enough text data to be labeled have been obtained.

Alternatively, the method provided by the present disclosure may further comprise the following steps: the labeling information for the text data to be labeled is obtained; the text data to be labeled is labeled with the labeling information to obtain the labeled data.

The labeled data is added to the evaluation data set. The evaluation data set is for model evaluation of the first text recognition model and the second text recognition model.

After the text data to be labeled is determined, the labeling information for the text data to be labeled may be further obtained. For example, the labeling information may be manually entered by the relevant user.

Based on the obtained labeling information, the text data to be labeled may be labeled to obtain the labeled data, so that the labeled data may also be added to the evaluation data set. Similarly as described previously, the evaluation data set may be configured to perform model evaluation on the first text recognition model and the second text recognition model. That is, after the evaluation data set is filled to a certain extent based on the above-described steps, when the evaluation data set has enough labeled data, the evaluation data set will be configured to perform model evaluation on the first text recognition model and the second text recognition model so as to compare the performances of the two models. The evaluation dimension of model evaluation is consistent with that provided previously, and the evaluation method concerns common knowledge of those skilled in the art, which will not be described in detail here.

It is to be noted that, the above-described steps may be performed after one piece of text data to be labeled is determined. Alternatively, the above-described steps may be performed for each piece of text data to be labeled respectively after all the required text data to be labeled are determined. The present disclosure has no limitation on the sequence here.

By way of the above-described technical solution, candidate data is obtained from a candidate data set constituted by a plurality of unlabeled text data, and candidate data is input into the first text recognition model and the second text recognition model respectively to obtain a first recognition result output from the first text recognition model and a second recognition result output from the second text recognition model. Thereinafter, it is determined whether the candidate data meets labeling condition according to the first recognition result and the second recognition result, and if the candidate data meets labeling condition, the candidate data is determined as the text data to be labeled. Wherein, the first text recognition model and the second text recognition model are both capable of identifying whether text data belongs to a target category, and the labeling condition is that the candidate data is recognized by the first text recognition model and/or the second text recognition model as belonging to the target category. Thus, only the text data that is recognized by the first text recognition model and/or the second text recognition model as belonging to the target category may be determined as the data to be labeled and used in the model performance evaluation of the first text model and the second text model. On the one hand, since the text data recognized by both the first text recognition model and the second text recognition model not as belonging to the target category has a slight effect on the model performance evaluation of the above-described two models, it is possible to filter out from the candidate data set the text data capable of presenting a preferred performance in the aspect of the model performance evaluation by way of the method provided by the present disclosure. On the other hand, since the text data recognized by both the first text recognition model and the second text recognition model not as belonging to the target category usually occupy a large proportion in the candidate data set, a large number of text data in the candidate data set may be filtered out by way of the method provided by the present disclosure, thereby avoiding the problem of a high labeling cost due to the selection of a large number of data in the candidate data set as data to be labeled.

Figure 3:
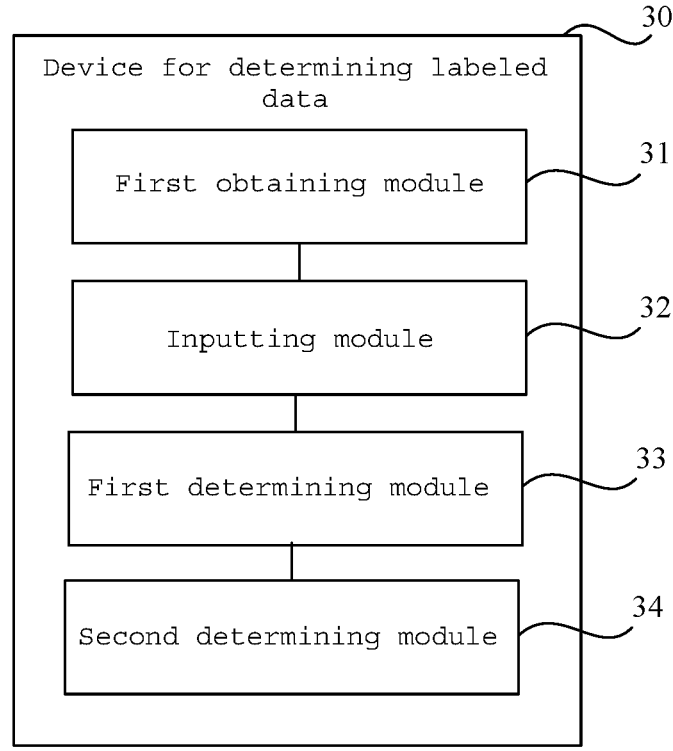
FIG. 3 is a block diagram of a device for determining labeled data provided according to embodiments of the present disclosure.

FIG. 3 is a block diagram of a device for determining labeled data provided according to embodiments of the present disclosure. As shown in FIG. 3, the device 30 comprises: a first obtaining module 31 configured to obtain candidate data from a candidate data set, wherein the candidate data set is a set constituted by a plurality of unlabeled text data; an input module 32 configured to input the candidate data into the first text recognition model and the second text recognition model respectively, and obtain a first recognition result output from the first text recognition model and a second recognition result output from the second text recognition model, wherein the first text recognition model and the second text recognition model are both capable of recognizing whether text data belongs to a target category; a first determining module 33 configured to determine whether the candidate data meets labeling condition according to the first recognition result and the second recognition result, wherein the labeling condition is that the candidate data is recognized by the first text recognition model and/or the second text recognition model as belonging to the target category; a second determining module 34 configured to determine the candidate data as text data to be labeled if it is determined that the candidate data meets the labeling condition.

Alternatively, the first recognition result and the second recognition result are both configured to indicate whether the candidate data belongs to the target category; The first determining module 33 comprises: A first determining sub-module configured to determine that the candidate data meets the labeling condition if the first identification result indicates that the candidate data belongs to a target category, or if the second identification result indicates that the candidate data belongs to a target category.

Alternatively, the first recognition result is a first score output from the first text recognition model for the candidate data, and the second recognition result is a second score output from the second text recognition model for the candidate data; the first determining module 33 comprises: a second determining sub-module configured to determine that the candidate data meets the labeling condition if the first score is greater than or equal to the score threshold, or if the second score is greater than or equal to the score threshold.

Alternatively, the device 30 is configured to determine the score threshold by the following module: a third determining module configured to determine whether the text data meets labeling condition for each text data in the candidate data set according to the first text recognition model, the second text recognition model and the target score used this time; the device 30 is configured to increase the target score if the number of text data in the candidate data set that meets the labeling condition is greater than the maximum sampling number, and return to the third determining module to determine whether the text data meets labeling condition for each text data in the candidate data set according to the first text recognition model, the second text recognition model and the target score used this time.

A fourth determining module configured to determine the target score used this time as the score threshold if the number of text data in the candidate data set that meets labeling condition is less than or equal to the maximum sampling number.

Alternatively, the third determining module is configured to perform the following operations for each text data in the candidate data set: the text data is input into the first text recognition model and the second text recognition model to obtain a third score output from the first text recognition model and a fourth score output from the second text model; if the third score is greater than or equal to the target score, or if the fourth score is greater than or equal to the target score, it is determined that the text data meets the labeling condition.

Alternatively, the device 30 is configured to: return to the first obtaining module to obtain candidate data from the candidate data set until any of the following two conditions is met after the second determining module determines the candidate data as text data to be labeled: all the text data in the candidate data set are traversed; the number of text data to be labeled reaches a preset sampling number.

Alternatively, the device 30 further comprises: a second obtaining module configured to obtain labeling information for the text data to be labeled; a labeling module configured to label the text data to be labeled by using the labeling information so as to obtain the labeled data; an adding module configured to add the labeled data to an evaluation data set, wherein the evaluation data set is configured to perform model evaluation on the first text recognition model and the second text recognition model.

Regarding the device in the above-described embodiment, the specific manner of performing an operation by each module therein has been described in detail in the embodiments concerning this method, and thus will not be elaborated in detail here.

Figure 4:
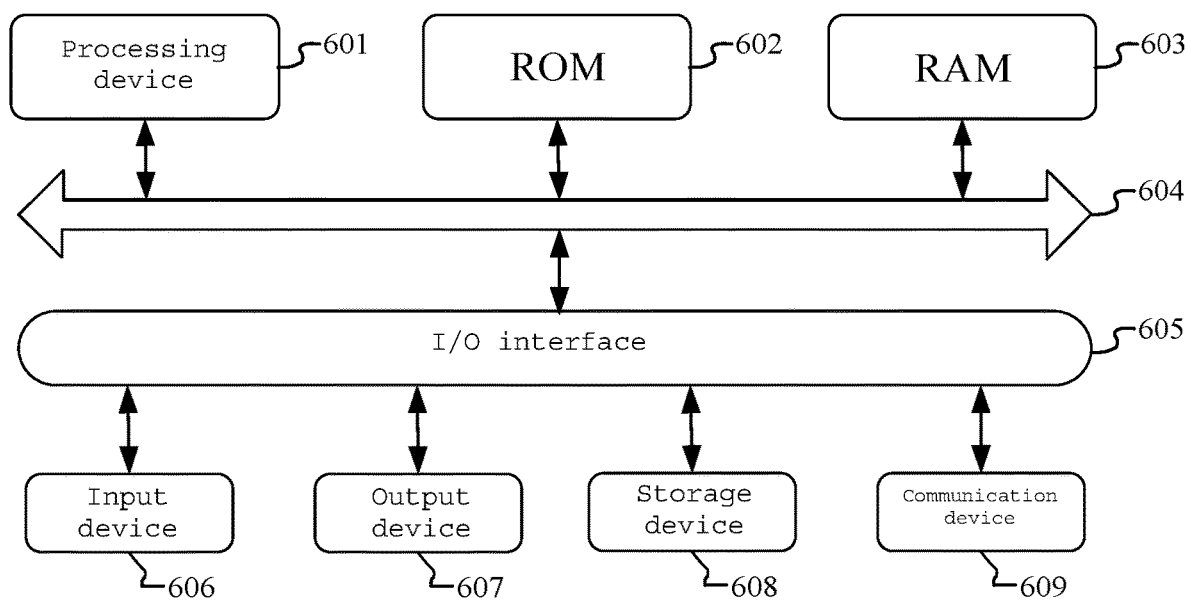
FIG. 4 shows a structural schematic view of an electronic device suitable for implementing embodiments of the present disclosure.

Next, refer to FIG. 4, which shows a structural schematic view of an electronic device 600 suitable for implementing an embodiment of the present disclosure. The terminal device in an embodiment of the present disclosure may comprise, but is not limited to, mobile terminals such as mobile phones, notebook computers, digital broadcast receivers, PDAs (personal digital assistants), PADs (pad computers), PMP (Portable Multimedia Player) and in-vehicle terminals (for example, in-vehicle navigation terminals); and fixed terminals such as digital TVs, desktop computers and the like. The electronic device shown in FIG. 4 which is only an example, shall not limit the function and operation scope of the embodiments of the present disclosure.

As shown in FIG. 4, the electronic device 600 may comprise a processing device (for example, a central processing unit, a graphic processor, and the like) 601, which may perform various suitable actions and processing according to a program stored in a Read-only Memory (ROM) 602 or a program loaded from a storage device 608 into a Random Access Memory (RAM) 603. In the RAM 603, various programs and data required for the operation of the electronic device 600 are also stored. The processing device 601, the ROM 602 and the RAM 603 are connected to each other through a bus 604. The input/output (I/O) interface 605 is also connected to the bus 604.

Generally, the following devices may be connected to the I/O interface 605: an input device 606 comprising, for example, a touch screen, a touch pad, a keyboard, a mouse, a camera, a microphone, an accelerometer, a gyroscope, and the like; an output device 607 comprising, for example, a Liquid Crystal Display (LCD), a speaker, a vibrator, and the like; a storage device 608 comprising, for example, a magnetic tape, a hard disk, and the like; and a communication device 609. The communication device 609 may allow the electronic device 600 to be in wireless or wired communication with other devices to exchange data. Although FIG. 4 shows the electronic device 600 with various devices, it should be understood that there is no requirement to implement or have all the devices shown. It is possible to alternatively implement or have more or less devices.

In particular, according to an embodiment of the present disclosure, the process described above with reference to the flowchart may be implemented as a computer software program. For example, in an embodiment of the present disclosure, there comprises a computer program product, which comprises a computer program carried on a non-transient computer-readable medium, wherein the computer program contains program codes for executing the method shown in the flowchart. In such embodiment, the computer program may be downloaded and installed from the network through the communication device 609, installed from the storage device 608, or installed from the ROM 602. When the computer program is executed by the processing device 601, the above-described functions defined in the method of the embodiment of the present disclosure are executed.

It is to be noted that, the above-described computer-readable medium of the present disclosure may be a computer-readable signal medium, a computer-readable storage medium or any combination thereof. The computer-readable storage medium may be, for example, but is not limited to: an electrical, magnetic, optical, electromagnetic, infrared, or semiconductor system, device, or apparatus, or a combination thereof. More specific examples of the computer-readable storage medium may comprise, but is not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program which may be used by an instruction execution system, apparatus, or device or used in combination therewith. In the present disclosure, the computer-readable signal medium may comprise a data signal propagated in a baseband or as a part of a carrier wave, wherein a computer-readable program code is carried. Such propagated data signal may take many forms, comprising but not limited to an electromagnetic signal, an optical signal, or any suitable combination thereof. The computer-readable signal medium may also be any computer-readable medium other than the computer-readable storage medium. The computer-readable signal medium may send, propagate, or transmit a program for use by an instruction execution system, apparatus, or device or in combination with therewith. The program code contained on the computer-readable medium may be transmitted by any suitable medium, comprising but not limited to: a wire, an optical cable, radio frequency (RF), and the like, or any suitable combination thereof.

In some embodiments, the server may communicate using any currently known or future developed network protocol such as HTTP (HyperText Transfer Protocol), and may be interconnected with digital data communication in any form or medium (for example, communication network). Examples of communication networks comprise a Local Area Network ("LAN"), a Wide Area Network ("WAN"), an extranet (for example, Internet) and an end-to-end network (for example, an ad hoc end-to-end network), as well as any currently known or future developed network.

The above-described computer-readable medium may be comprised in the above-described electronic device; or may also exist alone without being assembled into the electronic device.

The above-described computer-readable medium carries one or more programs that, when executed by the electronic device, cause the electronic device to: obtain candidate data from a candidate data set, wherein the candidate data set is a set constituted by a plurality of unlabeled text data; input the candidate data into a first text recognition model and a second text recognition model respectively to obtain a first recognition result output from the first text recognition model and a second recognition result output from the second text recognition model, so that the first text recognition model and the second text recognition model are both capable of recognizing whether text data belongs to a target category; determine whether the candidate data meets labeling condition according to the first recognition result and the second recognition result, wherein the labeling condition is that the candidate data is recognized by the first text recognition model and/or the second text recognition model as belonging to the target category; and determine the candidate data text data to be labeled if it is determined that the candidate data meets labeling condition.

The computer program code for performing the operations of the present disclosure may be written in one or more programming languages or a combination thereof. The above-described programming languages comprise but are not limited to object-oriented programming languages, such as Java, Smalltalk, and C++, and also comprise conventional procedural programming languages, such as "C" language or similar programming languages. The program code may be performed entirely on the user's computer, partly on the user's computer, executed as an independent software package, partly on the user's computer and partly executed on a remote computer, or entirely executed on the remote computer or server. In the case of a remote computer, the remote computer may be connected to the user's computer through any kind of network (comprising a local area network (LAN) or a wide area network (WAN)), or may be connected to an external computer (for example, connected through Internet using an Internet service provider).

The flowcharts and block views in the accompanying drawings illustrate the possibly implemented architectures, functions, and operations of the system, method, and computer program product according to various embodiments of the present disclosure. In this regard, each block in the flowchart or block view may represent a module, a program segment, or a part of code, wherein the module, the program segment, or the part of code contains one or more executable instructions for realizing a specified logic function. It should also be noted that, in some alternative implementations, the functions labeled in the block may also occur in a different order from the order labeled in the accompanying drawings. For example, two blocks shown in succession which may actually be executed substantially in parallel, may sometimes also be executed in a reverse order, depending on the functions involved. It should also be noted that each block in the block view and/or flowchart, and a combination of the blocks in the block view and/or flowchart, may be implemented by a dedicated hardware-based system that performs the specified functions or operations, or may be implemented by a combination of dedicated hardware and computer instructions.

The modules involved in the described embodiments of the present disclosure may be implemented in software or hardware. Wherein, the name of the module does not constitute the definition of the module itself in some cases. For example, the first obtaining module may also be described as "a module that obtains candidate data from a candidate data set".

The functions described hereinabove may be performed at least in part by one or more hardware logic components. For example, without limitation, the hardware logic components of a demonstrative type that may be used comprise: a Field Programmable Gate Array (FPGA), an Application Specific Integrated Circuit (ASIC), an Application Specific Standard Product (ASSP), a System on Chip (SOC), a Complex Programmable Logical device (CPLD) and the like.

The context of the present disclosure, a machine-readable medium may be a tangible medium, which may contain or store a program for use by the instruction execution system, apparatus, or device or use in combination with the instruction execution system, apparatus, or device. The machine-readable medium may be a machine-readable signal medium or a machine-readable storage medium. The machine-readable medium may comprise, but is not limited to, an electronic, electromagnetic, infrared, or semiconductor system, device or device, or any suitable combination thereof. More specific examples of the machine-readable storage medium may comprise an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, a method for determining labeled data is provided, wherein the method comprises: obtaining candidate data from a candidate data set, wherein the candidate data set is a set constituted by a plurality of unlabeled text data; inputting the candidate data into a first text recognition model and a second text recognition model respectively to obtain a first recognition result output from the first text recognition model and a second recognition result output from the second text recognition model, wherein the first text recognition model and the second text recognition model are both capable of recognizing whether text data belongs to a target category; determining whether the candidate data meets labeling condition according to the first recognition result and the second recognition result, wherein the labeling condition is that the candidate data is recognized by the first text recognition model and/or the second text recognition model as belonging to the target category; determining the candidate data as text data to be labeled if it is determined that the candidate data meets the labeling condition.

According to one or more embodiments of the present disclosure, a method for determining labeled data is provided, wherein the first recognition result and the second recognition result are both configured to indicate whether the candidate data belongs to the target category; the step of determining whether the candidate data meets labeling condition according to the first recognition result and the second recognition result comprises: determining that the candidate data meets the labeling condition if the first identification result indicates that the candidate data belongs to a target category, or if the second identification result indicates that the candidate data belongs to a target category.

According to one or more embodiments of the present disclosure, a method for determining labeled data is provided, wherein the first recognition result is a first score output from the first text recognition model for the candidate data, and the second recognition result is a second score output from the second text recognition model for the candidate data; the step of determining whether the candidate data meets labeling condition according to the first recognition result and the second recognition result comprises: determining that the candidate data meets labeling condition if the first score is greater than or equal to a score threshold, or if the second score is greater than or equal to the score threshold.

According to one or more embodiments of the present disclosure, a method for determining labeled data is provided, wherein the score threshold is determined by the following steps: determining whether the text data meets the labeling condition for each text data in the candidate data set according to the first text recognition model, the second text recognition model and the target score used this time; increasing the target score if the number of text data in the candidate data set that meets the labeling condition is greater than the maximum sampling number, and returning to the step of determining whether the text data meets the labeling condition for each text data in the candidate data set according to the first text recognition model, the second text recognition model and the target score used this time; determining the target score used this time as the score threshold if the number of text data in the candidate data set that meets the labeling condition is less than or equal to the maximum sampling number.

According to one or more embodiments of the present disclosure, a method for determining labeled data is provided, wherein the step of determining whether the text data meets the labeling condition according to the first text recognition model, the second text recognition model and the target score used this time comprises: inputting the text data into the first text recognition model and the second text recognition model to obtain a third score output from the first text recognition model and a fourth score output from the second text model; determining that the text data meets the labeling condition if the third score is greater than or equal to the target score, or if the fourth score is greater than or equal to the target score.

According to one or more embodiments of the present disclosure, a method for determining labeled data is provided, and after the step of determining the candidate data as text data to be labeled, the method further comprises: returning to the step of obtaining candidate data from the candidate data set until any of the following two conditions is satisfied: all the text data is transverse in the candidate data set; the number of the text data to be labeled reaches a preset sampling number.

According to one or more embodiments of the present disclosure, a method for determining labeled data is provided, wherein the method: further comprises: obtaining the labeling information for the text data to be labeled; labeling the text data to be labeled by using the labeling information so as to obtain the labeled data; adding the labeled data to an evaluation data set, wherein the evaluation data set is configured to perform model evaluation on the first text recognition model and the second text recognition model.

According to one or more embodiments of the present disclosure, a device for determining labeled data is provided, the device comprising: a first obtaining module configured to obtain candidate data from a candidate data set, wherein the candidate data set is a set constituted by a plurality of unlabeled text data; an input module configured to input the candidate data into a first text recognition model and a second text recognition model respectively, and obtain a first recognition result output from the first text recognition model and a second recognition result output from the second text recognition model, wherein the first text recognition model and the second text recognition model are both capable of recognizing whether text data belongs to a target category; a first determining module configured to determine whether the candidate data meets labeling condition according to the first recognition result and the second recognition result, wherein the labeling condition is that the candidate data is recognized by the first text recognition model and/or the second text recognition model as belonging to the target category; a second determining module configured to determine the candidate data as text data to be labeled if it is determined that the candidate data meets the labeling condition.

According to one or more embodiments of the present disclosure, a non-transitory computer-readable medium is provided, wherein the medium has a computer program stored thereon that, when executed by a processing device, implements the steps of the method for determining labeled data according to any of the embodiments of the present disclosure.

According to one or more embodiments of the present disclosure, an electronic device is provided, wherein the device comprises: a storage device having a computer program stored thereon; a processing device for executing the computer program in the storage device to implement the steps of the method for determining labeled data according to any of the embodiments of the present disclosure.

According to one or more embodiments of the present disclosure, a computer program is provided, wherein the computer program comprises: instructions that, when executed by a processor, cause the processor to perform the method for determining labeled data according to any of the above-described embodiments.

According to one or more embodiments of the present disclosure, a computer program product is provided, wherein the computer program product comprises: instructions that, when executed by a processor, cause the processor to perform the method for determining labeled data according to any of the above-described embodiments.

The above description is only an explanation of preferred embodiments of the present disclosure and the applied technical principles. Those skilled in the art should understand that the scope of disclosure involved in this disclosure is not limited to the technical solutions formed by the specific combination of the above technical features, and at the same time should also cover other technical solutions formed by arbitrarily combining the above-described technical features or equivalent features without departing from the above disclosed concept. For example, the above-described features and the technical features disclosed in the present disclosure (but not limited thereto) having similar functions are replaced with each other to form a technical solution.

In addition, although the operations are depicted in a specific order, this should not be understood as requiring these operations to be performed in the specific order shown or performed in a sequential order. Under certain circumstances, multitasking and parallel processing might be advantageous. Likewise, although several specific implementation details are contained in the above discussion, these should not be construed as limiting the scope of the present disclosure. Certain features that are described in the context of individual embodiments may also be implemented in combination in a single embodiment. Conversely, various features described in the context of a single embodiment may also be implemented in multiple embodiments individually or in any suitable sub-combination.

Although the present subject matter has been described in language specific to structural features and/or methodological actions, it should be understood that the subject matter defined in the appended claims is not necessarily limited to the specific features or actions described above. On the contrary, the specific features and actions described above are only exemplary forms of implementing the claims. Regarding the device in the above-described embodiment, the specific manner of performing an operation by each module therein has been described in detail in the embodiments concerning this method, and thus will not be elaborated in detail here.

What is claimed is:

1. A method for determining labeled data, comprising steps of:

obtaining candidate data from a candidate data set, wherein the candidate data set is a set constituted by a plurality of unlabeled text data;

inputting the candidate data into a first text recognition model and a second text recognition model respectively to obtain a first recognition result output from the first text recognition model and a second recognition result output from the second text recognition model, wherein the first text recognition model and the second text recognition model are both capable of recognizing whether text data belongs to a target category;

determining whether the candidate data meets a labeling condition according to the first recognition result and the second recognition result, wherein the labeling condition is that the candidate data is recognized by at least one of the first text recognition model or the second text recognition model as belonging to the target category;

determining the candidate data as text data needing to be labeled if it is determined that the candidate data meets the labeling condition; and determining the candidate data as text data not needing to be labeled if it is determined that the candidate data does not meet the labeling condition, wherein the first recognition result is a first score output from the first text recognition model for the candidate data, the second recognition result is a second score output from the second text recognition model for the candidate data, the determining whether the candidate data meets the labeling condition according to the first recognition result and the second recognition result comprises:

determining that the candidate data meets the labeling condition if the first score is greater than or equal to a score threshold, or if the second score is greater than or equal to the score threshold, and wherein the score threshold is determined by the following steps:

determining whether the text data meets the labeling condition for each text data in the candidate data set according to the first text recognition model, the second text recognition model and a target score used this time;

increasing the target score if a number of text data in the candidate data set that meets the labeling condition is greater than a maximum sampling number;

performing the step of determining whether the text data meets the labeling condition for each text data in the candidate data set again based on the increased target score and determining whether a number of text data in the candidate data set that meets the labeling condition is greater than the maximum sampling number; and determining the increased target score as the score threshold if the number of text data in the candidate data set that meets the labeling condition is less than or equal to the maximum sampling number.

2. The method for determining labeled data according to claim 1, wherein the first recognition result and the second recognition result are both configured to indicate whether the candidate data belongs to the target category, and the determining whether the candidate data meets the labeling condition according to the first recognition result and the second recognition result comprises:

determining that the candidate data meets the labeling condition if the first identification result indicates that the candidate data belongs to the target category, or if the second identification result indicates that the candidate data belongs to the target category.

3. The method for determining labeled data according to claim 1, wherein the determining whether the text data meets the labeling condition for each text data in the candidate data set according to the first text recognition model, the second text recognition model and the target score used this time comprises:

inputting the text data into the first text recognition model and the second text recognition model to obtain a third score output from the first text recognition model and a fourth score output from the second text model; and determining that the text data meets the labeling condition if the third score is greater than or equal to the target score, or if the fourth score is greater than or equal to the target score.

4. The method for determining labeled data according to claim 1, further comprising, after the determining the candidate data as the text data to be labeled:

repeating the steps until any of following two conditions is satisfied:

all text data in the candidate data set are traversed; or a number of text data to be labeled reaches a preset sampling number.

5. The method for determining labeled data according to claim 1, further comprising:

obtaining labeling information for the text data to be labeled;

labeling the text data to be labeled by using the labeling information to obtain labeled data; and adding the labeled data to an evaluation data set for performing model evaluation on the first text recognition model and the second text recognition model.

6. A non-transitory computer-readable medium having a computer program stored thereon that, when executed by a processing device, implements a method for determining labeled data, comprising:

obtaining candidate data from a candidate data set, wherein the candidate data set is a set constituted by a plurality of unlabeled text data;

inputting the candidate data into a first text recognition model and a second text recognition model respectively to obtain a first recognition result output from the first text recognition model and a second recognition result output from the second text recognition model, wherein the first text recognition model and the second text recognition model are both capable of recognizing whether text data belongs to a target category;

determining whether the candidate data meets a labeling condition according to the first recognition result and the second recognition result, wherein the labeling condition is that the candidate data is recognized by at least one of the first text recognition model or the second text recognition model as belonging to the target category;

determining the candidate data as text data needing to be labeled if it is determined that the candidate data meets the labeling condition; and determining the candidate data as text data not needing to be labeled if it is determined that the candidate data does not meet the labeling condition, wherein the first recognition result is a first score output from the first text recognition model for the candidate data, the second recognition result is a second score output from the second text recognition model for the candidate data, and the computer program implements following steps:

determining that the candidate data meets the labeling condition if the first score is greater than or equal to a score threshold, or if the second score is greater than or equal to the score threshold, and wherein the score threshold is determined by the following steps:

determining whether the text data meets the labeling condition for each text data in the candidate data set according to the first text recognition model, the second text recognition model and a target score used this time;

increasing the target score if a number of text data in the candidate data set that meets the labeling condition is greater than a maximum sampling number, performing the determining whether the text data meets the labeling condition for each text data in the candidate data set, the second text recognition model and a target score used this time again based on the increased target score, and determining whether a number of text data in the candidate data set that meets the labeling condition is greater than the maximum sampling number; and determining the increased target score as the score threshold if the number of text data in the candidate data set that meets the labeling condition is less than or equal to the maximum sampling number.

7. An electronic device, comprising:

a storage device having a computer program stored thereon;

a processing device for executing the computer program in the storage device to implement a method for determining labeled data, comprising:

obtaining candidate data from a candidate data set, wherein the candidate data set is a set constituted by a plurality of unlabeled text data;

inputting the candidate data into a first text recognition model and a second text recognition model respectively to obtain a first recognition result output from the first text recognition model and a second recognition result output from the second text recognition model, wherein the first text recognition model and the second text recognition model are both capable of recognizing whether text data belongs to a target category;

determining whether the candidate data meets a labeling condition according to the first recognition result and the second recognition result, wherein the labeling condition is that the candidate data is recognized by at least one of the first text recognition model or the second text recognition model as belonging to the target category;

determining the candidate data as text data needing to be labeled if it is determined that the candidate data meets the labeling condition; and determining the candidate data as text data not needing to be labeled if it is determined that the candidate data does not meet the labeling condition, wherein the first recognition result is a first score output from the first text recognition model for the candidate data, the second recognition result is a second score output from the second text recognition model for the candidate data, and the processing device implements following steps:

determining that the candidate data meets the labeling condition if the first score is greater than or equal to a score threshold, or if the second score is greater than or equal to the score threshold, and the score threshold is determined by the following steps:

determining whether the text data meets the labeling condition for each text data in the candidate data set according to the first text recognition model, the second text recognition model and a target score used this time;

increasing the target score if a number of text data in the candidate data set that meets the labeling condition is greater than a maximum sampling number, performing the determining whether the text data meets the labeling condition for each text data in the candidate data set, the second text recognition model and a target score used this time again based on the increased target score, and determining whether a number of text data in the candidate data set that meets the labeling condition is greater than the maximum sampling number; and determining the increased target score as the score threshold if the number of text data in the candidate data set that meets the labeling condition is less than or equal to the maximum sampling number.

8. The electronic device according to claim 7, wherein the first recognition result and the second recognition result are both configured to indicate whether the candidate data belongs to the target category, and the processing device implements following steps:

determining that the candidate data meets the labeling condition if the first identification result indicates that the candidate data belongs to the target category, or if the second identification result indicates that the candidate data belongs to the target category.

9. The electronic device according to claim 7, wherein the processing device implements following steps:

inputting the text data into the first text recognition model and the second text recognition model to obtain a third score output from the first text recognition model and a fourth score output from the second text model; and determining that the text data meets the labeling condition if the third score is greater than or equal to the target score, or if the fourth score is greater than or equal to the target score.

10. The electronic device according to claim 7, wherein the processing device implements following steps:

after the determining the candidate data as the text data to be labeled, repeating the steps until any of following two conditions is satisfied:

all text data in the candidate data set are traversed; or a number of text data to be labeled reaches a preset sampling number.

11. The electronic device according to claim 7, wherein the processing device implements following steps:

obtaining labeling information for the text data to be labeled;

labeling the text data to be labeled by using the labeling information to obtain labeled data; and adding the labeled data to an evaluation data set for performing model evaluation on the first text recognition model and the second text recognition model.

12. The non-transitory computer-readable medium according to claim 6, wherein the first recognition result and the second recognition result are both configured to indicate whether the candidate data belongs to the target category, and the computer program implements following steps:

determining that the candidate data meets the labeling condition if the first identification result indicates that the candidate data belongs to the target category, or if the second identification result indicates that the candidate data belongs to the target category.

13. The non-transitory computer-readable medium according to claim 6, wherein the computer program implements following steps:

inputting the text data into the first text recognition model and the second text recognition model to obtain a third score output from the first text recognition model and a fourth score output from the second text model; and
determining that the text data meets the labeling condition if the third score is greater than or equal to the target score, or if the fourth score is greater than or equal to the target score.

14. The non-transitory computer-readable medium according to claim 6, wherein the computer program implements following steps:
after the determining the candidate data as the text data to be labeled, repeating the steps until any of following two conditions is satisfied:
all text data in the candidate data set are traversed; or
a number of text data to be labeled reaches a preset sampling number.

* * * * *